Patented Apr. 22, 1924.

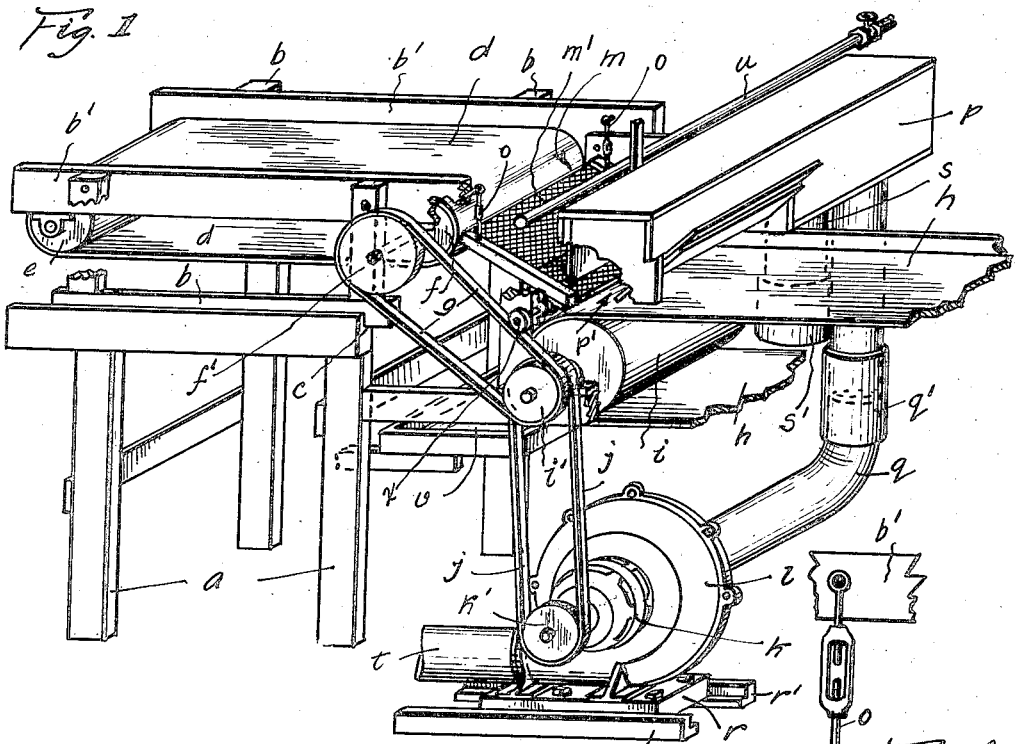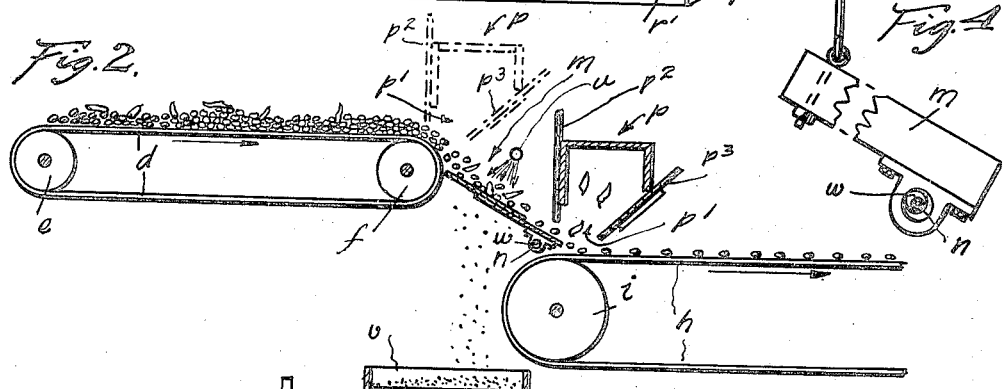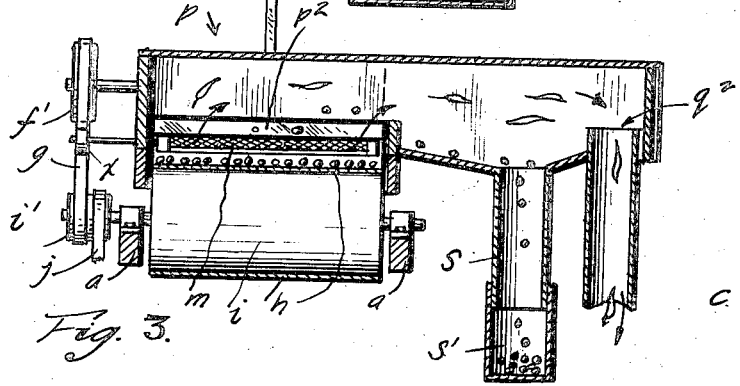

1,491,211

UNITED STATES PATENT OFFICE.

CHARLES OTIS TAYLOR, OF CORVALLIS, OREGON.

DISTRIBUTING AND CLEANING DEVICE FOR FRUIT AND THE LIKE.

Application filed April 26, 1923. Serial No. 634,813.

*To all whom it may concern:*

Be it known that I, CHARLES OTIS TAYLOR, a citizen of the United States, and a resident of Corvallis, county of Benton, and State of Oregon, have invented a new and useful Improvement in Distributing and Cleaning Devices for Fruit and the like, of which the following is a specification.

My invention relates to the distributing, and incidentally the cleaning of fruit, especially small fruit such as berries.

The object of my invention is to provide a device for the purpose specified, on which the fruit may be deposited in batches, and by which the fruit will first be cleaned, and then evenly distributed onto sorting belts where the imperfect pieces of fruit may be removed by hand. It is further my purpose to accomplish these several steps without the use of mechanism which might bruise or crush the fruit.

A further object of my invention is to combine with the distributing mechanism, cleaning or washing means especially adapted for removing the foreign substances from the fruit during the distributing process.

A still further object of my invention is to adapt the various devices for suitable adjustment so as to facilitate the work.

I attain my objects by a device of the character described, comprising upper and lower conveyor belts spaced apart and running at unequal speeds, a connecting inclined oscillatory, screen like bridge between said conveyor belts, means for oscillating said bridge, means for directing a washing spray upon said bridge, and suction creating means located above said bridge.

The construction and operation of my invention is hereinafter fully described, having reference to the accompanying drawings, in which:

Fig. 1 is a perspective view of my improved mechanism with parts broken away to show details of construction;

Fig. 2 is a diagrammatic representation of the sorting and cleaning action of my machine;

Fig. 3 is a section taken through the suction head and diagrammatically shows how the lighter materials are picked up by the suction devices and removed from the fruit being conveyed; and Fig. 4 is an enlarged detail view of the inclined plane connecting the two belts of my machine.

My device is made with a frame $a$ which has a slidable top structure $b$ which slides in the groove $c$ in the frame $a$. The top structure $b$ supports the upper conveying belt $d$ on which the fruit is deposited. This belt is mounted about pulleys $e$ and $f$, the pulleys $f$ being driven by an outboard pulley $f'$ over which is mounted a belt $g$. Side boards $b'$ are provided alongside of the belt $d$ to prevent the fruit from being crowded off the belt sideways. A lower mounted conveying belt is mounted over pulley $i$. This pulley has an outboard pulley $i'$ over which the other end of the belt $g$ is mounted and this pulley is driven by a belt $j$ mounted over the outboard pulley $k'$ of the motor $k$. The motor $k$ also rotates the centrifugal fan $l$. The belt $h$ runs at a considerably faster speed than the belt $d$ as can be noted by the relative size of the pulleys $i$ and $f$ and their outboard pulleys $i'$ and $f'$. These belts are connected by an inclined plane $m$ which is adjustable as to length and angle and which is made with a perforated section $m'$, preferably a wire screen. This inclined plane is pivotally mounted as at $n$ and is supported on its other end by an adjustable rod and turn buckle structure $o$ which is connected to the side boards $b'$. A suction box $p$ is provided which has an adjustable opening $p'$. A pipe $q$ connects the fan $l$ and the suction box housing $p$ and has a slip joint connection $q'$ which permits the suction box to be raised and lowered vertically. The fan $l$ is mounted on the sliding base $r$ which is mounted on rails $r'$ and thus the fan, its connection pipe and the suction box can be moved horizontally. It can thus be seen that the suction box $p$ can be moved so that its opening $p'$ can be placed in any position over the inclined plane $m$ altho in practice it has been found that the best place to clean fruit when the suction box is used alone is on the bottom of the inclined plane. The suction box housing is made with a receptacle $s$ which has a removable cap $s'$. It is placed slightly before and slightly below the opening $q^3$ to the suction pipe $q$ and thus as the fan draws the air thru the housing it will pull the lighter material into the pipe $q$ but the heavier materials, such, for example, as under-sized fruit, will be rolled into the receptacle $s$ and by removing the cap $s'$ this fruit can be reclaimed. The lighter materials are drawn into the fan and forced outwardly into the exhaust pipe t. Sometimes it is desired that the fruit be washed instead of having a suction force exerted upon it, and I have provided a perforated pipe u which will throw a spray on the fruit passing over the perforated inclined plane and will wash the foreign substances thru the screen into a containing pan v placed thereunder. Sometimes it is desired that the suction and the jet be used together and under these conditions I place the suction box at the head of the inclined plane so as to remove the leaves and lighter substances from the fruit just as the fruit breaks over the conveying belt d and the leaves are thus removed and the heavier and smaller substances such as sand, are washed from the fruit and thru the perforated screen as previously described. I provide cams w on the shaft n on which the inclined screen is pivotally mounted and thus as this shaft n is rotated by the pulley x one end of the screen is given a vertical oscillation. The opening p' in the suction housing p is controllable by two sliding gates $p^2$ and $p^3$, which are arranged angularly with each other. The extending of either of these gates closes the opening relatively.

I claim:

1. In a device of the character described, comprising upper and lower conveyor belts spaced apart the lower belt running at a greater rate of speed than the upper one, a connecting, inclined, oscillatory bridge between said conveyor belts, and means for oscillating said bridge.

2. In a device of the character described, comprising upper and lower conveyor belts spaced apart and running at unequal speeds, a connecting, inclined bridge between said conveyor belts, said bridge being adjustable in length to vary the speed of the fruit rolling over the bridge from the upper to the lower of said conveyor belts.

3. In a device of the character described, comprising upper and lower conveyor belts spaced apart said belts being substantially parallel and the lower belt running at a greater rate of speed than the upper belt, a connecting, inclined, oscillatory, screen like bridge between said conveyor belts, and means for oscillating said bridge.

4. In a device of the character described, comprising upper and lower conveyor belts spaced apart and running at unequal speeds, a connecting, inclined, oscillatory bridge between said conveyor belts, said bridge being adjustable in length to vary the speed of the fruit rolling over the bridge from the upper to the lower of said conveyor belts, and means for oscillating said bridge.

5. In a device of the character described, comprising upper and lower conveyor belts spaced apart and running at unequal speeds, a connecting, inclined, oscillatory, screen like bridge between said conveyor belts, said bridge being adjustable in length to vary the speed of the fruit rolling over the bridge from the upper to the lower of said conveyor belts, and means for oscillating said bridge.

6. In a device of the character described, comprising upper and lower conveyor horizontal belts spaced apart the lower belt running at a greater rate of speed than the upper one, a connecting, inclined, screen like bridge between said conveyor belts, and means for directing a washing spray upon said bridge.

7. In a device of the character described, comprising upper and lower conveyor belts both belts being substantially horizontal and spaced apart and running at unequal speeds, a connecting, inclined, oscillatory, screen like bridge between said conveyor belts, means for oscillating said bridge, and means for directing a washing spray upon said bridge.

8. In a device of the character described, comprising upper and lower conveyor belts spaced apart and running at unequal speeds, a connecting, inclined, screen like bridge between said conveyor belts, and suction creating means located above said bridge.

9. In a device of the character described, comprising upper and lower conveyor belts spaced apart and running at unequal speeds, a connecting, inclined, oscillatory, screen like bridge between said conveyor belts, means for oscillating said bridge, and suction creating means located above said bridge.

10. In a device of the character described, comprising upper and lower conveyor belts spaced apart and running at unequal speeds, a connecting, inclined, oscillatory, screen like bridge between said conveyor belts, means for oscillating said bridge, means for directing a washing spray upon said bridge, and suction creating means located above said bridge.

11. In a device of the character described, upper and lower conveyor belts spaced apart and running at unequal speeds, a screen like inclined bridge from the upper to the lower of said conveyor belts, said bridge being suspended at its upper end, the suspending means being adapted to permit the oscillation of the bridge, and means for oscillating the bridge.

12. In a device of the character described, upper and lower conveyor belts spaced apart and running at unequal speeds, a screen like inclined bridge from the upper to the lower of said conveyor belts, said bridge being suspended at its upper end, the suspending means being adapted to permit the oscillation of the bridge, and adjustable so that the inclination of said bridge may be varied, and means for oscillating the bridge.

13. In a device of the character described, upper and lower conveyor belts spaced apart and running at unequal speeds, a screen like inclined bridge from the upper to the lower of said conveyor belts, said bridge being suspended at its upper end, the suspending means being adapted to permit the oscillation of the bridge, a driven shaft extending transversely of the lower end of said bridge, cams on said shaft, and cam boxes on said lower end of the bridge in which said cams bear.

14. In a device of the character described, upper and lower conveyor belts spaced apart and running at unequal speeds, a screen like inclined bridge from the upper to the lower of said conveyor belts, such bridge being suspended at its upper end, the suspending means being adapted to permit the oscillation of the bridge, means for oscillating the bridge, suction creating means located above said bridge, the means for driving the suction means, the suction means, the driving means and said conveyor belts being relatively movable longitudinally of the device, so as to bring them into the desired operative relation.

15. In a device of the character described, upper and lower conveyor belts spaced apart and running at unequal speeds, a screen like inclined bridge from the upper to the lower of said conveyor belts, said bridge being suspended at its upper end, the suspending means being adapted to permit the oscillation of the bridge, means for oscillating the bridge, a housing extending transversely over the bridge, a fan, and a slip joint pipe between the housing and the fan.

16. In a device of the character described, upper and lower conveyor belts spaced apart and running at unequal speeds, a screen like inclined bridge from the upper to the lower of said conveyor belts, said bridge being suspended at its upper end, the suspending means being adapted to permit the oscillation of the bridge, means for oscillating the bridge, a housing extending transversely over the bridge, a fan, a slip joint pipe between the housing and the fan, the fan and one of said conveyor belts being movable lengthwise of the device.

C. OTIS TAYLOR.